(12) United States Patent
Zywicki et al.

(10) Patent No.: US 11,879,838 B2
(45) Date of Patent: Jan. 23, 2024

(54) VICARIOUS CALIBRATION USING SOLAR GLINT OVER WATER

(71) Applicant: RAYTHEON COMPANY, Waltham, MA (US)

(72) Inventors: Randall W. Zywicki, McKinney, TX (US); Stephen J. Schiller, La Mirada, CA (US)

(73) Assignee: RAYTHEON COMPANY, Waltham, MA (US)

( * ) Notice: Subject to any disclaimer, the term of this patent is extended or adjusted under 35 U.S.C. 154(b) by 396 days.

(21) Appl. No.: 17/228,966

(22) Filed: Apr. 13, 2021

(65) Prior Publication Data
US 2022/0326149 A1 Oct. 13, 2022

(51) Int. Cl.
| | | |
|---|---|---|
| G06T 7/80 | (2017.01) | |
| G01N 21/3577 | (2014.01) | |
| G02B 5/18 | (2006.01) | |
| G01J 3/28 | (2006.01) | |
| G01N 21/17 | (2006.01) | |

(52) U.S. Cl.
CPC ........ *G01N 21/3577* (2013.01); *G01J 3/2803* (2013.01); *G01J 3/2823* (2013.01); *G02B 5/1861* (2013.01); *G06T 7/80* (2017.01); *G01N 2021/1793* (2013.01); *G06T 2207/10032* (2013.01)

(58) Field of Classification Search
CPC ............ G06T 7/80; G06T 2207/10032; G01N 21/3577; G01N 2021/1793; G01J 3/2803; G01J 3/2823; G02B 5/1861
See application file for complete search history.

(56) References Cited

U.S. PATENT DOCUMENTS

| | | | |
|---|---|---|---|
| 8,158,929 B2* | 4/2012 | Schiller | G01J 5/02 |
| | | | 250/252.1 |
| 9,068,886 B2* | 6/2015 | Silny | G01J 3/2803 |
| 2015/0302567 A1* | 10/2015 | Patterson | G06V 20/13 |
| | | | 382/191 |

OTHER PUBLICATIONS

Van Der Meer et al., "Imaging Spectrometry Basic Principles and Prospective Applications: Chapter 2 Imaging Spectrometry: Basic Analytical Techniques", Springer 2002 (Year: 2002).*
Kay et al., "Sun Glint Correction of High and Low Spatial Resolution Images of Aquatic Scenes: a Review of Methods for Visible nd Near-Infrared Wavelengths", Remote Sens. 2009, 1, 697-730 (Year: 2009).*

* cited by examiner

*Primary Examiner* — Regis J Betsch
(74) *Attorney, Agent, or Firm* — Lando & Anastasi, LLP

(57) ABSTRACT

A method for vicarious spatial characterization of a remote sensor system. The method includes detecting, via the remote sensor system, radiation reflected from at least one body of water corresponding to a plurality of point reflector images, selecting a set of point reflector images from the plurality of point reflector images, the selected set of point reflector images corresponding to sub-pixel point reflector images, analyzing the selected set of point reflector images by executing an algorithm for fitting the point reflector images to obtain a point spread function of the remote sensor system, and determining a spatial characteristic of the remote sensor system based on the point spread function.

20 Claims, 13 Drawing Sheets

VICARIOUS CALIBRATION USING SOLAR GLINT OVER WATER

BACKGROUND

1. Field

Embodiments of the disclosure relate generally to imaging and spectral remote sensor systems and, more particularly, to systems and methods of using solar glint over water to calibrate remote sensor systems.

2. Discussion of Related Art

As is known in the art, airborne and space based imaging and spectral remote sensor systems have been used to measure physical properties of the Earth. In many cases, such remote sensors systems are calibrated to improve spectral, radiometric, and/or spatial accuracy. For example, the spectral response of the sensor system can be measured vicariously using atmospheric absorption lines and the radiometric response of the sensor system can be measured vicariously using measured solar, atmospheric, and terrestrial data. In some cases, the spatial response of the sensor system may be measured vicariously using targets placed in static locations.

SUMMARY

At least one aspect of the present disclosure is directed to a method for vicarious spatial characterization of a remote sensor system. The method includes detecting, via the remote sensor system, radiation reflected from at least one body of water corresponding to a plurality of point reflector images, selecting a set of point reflector images from the plurality of point reflector images, the selected set of point reflector images corresponding to sub-pixel point reflector images, analyzing the selected set of point reflector images by executing an algorithm for fitting the point reflector images to obtain a point spread function of the remote sensor system, and determining a spatial characteristic of the remote sensor system based on the point spread function.

In one embodiment, the method includes calibrating the remote sensor system based on the spatial characteristic of the remote sensor system. In some embodiments, calibrating the remote sensor system includes adjusting a focus of the remote sensor system based on the spatial characteristic in response to the point spread function being outside of a threshold range.

In one embodiment, detecting radiation reflected from the at least one body of water includes detecting a specular reflection of solar irradiance provided to the at least one body of water at an incident angle, the specular reflection being provided by at least one of wave facets and wave whitecaps in the at least one body of water. In certain embodiments, detecting the specular reflection of the solar irradiance includes detecting specular reflections of the solar irradiance over a plurality of incident angles. In various embodiments, the remote sensor system is located on one of a manned or unmanned aircraft, a satellite, or another aerial vehicle, and the method includes positioning the remote sensor system such that the at least one body of water is in a field of view of the remote sensor system.

In some embodiments, analyzing the selected set of point reflector images by executing the algorithm for fitting the point reflector images to obtain the point spread function of the remote sensor system includes fitting each of the selected point reflector images using a fitting function, determining a figure of merit of the fitting function for each of the selected point reflector images to obtain a plurality of figures of merit, calculating a sum of all the figures of merit, and minimizing the sum of all the figures of merit to obtain the point spread function of the remote sensor system. In one embodiment, the figure of merit is a root mean square error. In various embodiments, the method includes fitting each of the selected point reflector images without varying a full width at half maximum parameter of the fitting function and minimizing the sum of all figures of merit. In certain embodiments, the method includes shifting a fitting function of each of the selected point reflector images to superimpose a fitting function corresponding to each selected point reflector image to obtain co-registered fitting functions. In one embodiment, determining the spatial characteristic includes determining a spatial resolution of the remote sensor system from the full width at half maximum of the fitting function.

Another aspect of the present disclosure is directed to a remote sensor system configured to provide imaging for airborne and/or space-based applications. The remote sensor system includes an electro-optical/infrared (EO/IR) sensor configured to detect radiation reflected from a body of water, a receiver configured to receive a plurality of point reflector images corresponding to the radiation detected by the EO/IR sensor, and a processor coupled to the receiver and configured to select a set of point reflector images from the plurality of point reflector images, the selected set of point reflector images corresponding to sub-pixel point reflector images, analyze the selected set of point reflector images by executing an algorithm for fitting the point reflector images to obtain a point spread function of the remote sensor system, and determine a spatial characteristic of the remote sensor system based on the point spread function.

In one embodiment, the processor is configured to calibrate the remote sensor system based on the spatial characteristic of the remote sensor system. In some embodiments, calibrating the remote sensor system includes adjusting a focus of the remote sensor system based on the spatial characteristic in response to the point spread function being outside of a threshold range.

In one embodiment, the radiation detected by the EO/IR sensor corresponds to a specular reflection of solar irradiance provided to the at least one body of water at an incident angle, the specular reflection being provided by at least one of wave facets and wave whitecaps in the at least one body of water. In various embodiments, the EO/IR sensor is configured to detect radiation corresponding to specular reflections of the solar irradiance over a plurality of incident angles. In certain embodiments, the remote sensor system is located on one of a manned or unmanned aircraft, a satellite, or another aerial vehicle that is positioned such that the at least one body of water is within a field of view of the remote sensor system.

In some embodiments, the EO/IR sensor is configured to detect radiation having wavelengths between 3 μm to 14 μm. In one embodiment, to analyze the selected set of point reflector images by executing the algorithm for fitting the point reflector images to obtain the point spread function of the remote sensor system, the processor is configured to fit each of the selected point reflector images using a fitting function, determine a figure of merit of the fitting function for each of the selected point reflector images to obtain a plurality of figures of merit, calculate a sum of all the figures of merit, and minimize the sum of all the figures of merit to obtain the point spread function of the remote sensor system. In one embodiment, the figure of merit is a root mean square error. In various embodiments, the processor is configured to execute a first loop to fit each of the selected point reflector images without varying a full width at half maximum parameter of the fitting function and execute a second loop to minimize the sum of all the figures of merit. In certain embodiments, the processor is configured to shift a fitting function of each of the selected point reflector images to superimpose the fitting function corresponding to each selected point reflector image to obtain co-registered fitting functions.

In one embodiment, the fitting function is a two-dimensional Gaussian fitting function. In some embodiments, the spatial characteristic includes a spatial resolution of the remote sensor system corresponding to the full width at half maximum of the fitting function.

Another aspect of the present disclosure is directed to a system for vicarious spatial characterization of a remote sensor system. The system includes a processor configured to analyze a plurality of spot images corresponding to solar glint reflected from a body of water by fitting the images to obtain a point spread function of the remote sensor system, the processor further configured to execute an algorithm for fitting the images, wherein the algorithm includes fitting each of the plurality of spot images using a fitting function, determining a root mean square error of the fitting function for each of the plurality of spot images to obtain a plurality of root mean square errors, calculating a sum of all the root mean square errors, and minimizing the sum of all the root mean square errors to obtain a point spread function of the remote sensor system, and wherein the processor is further configured to execute a first loop to fit each of the plurality of spot images without varying a full width at half maximum parameter of the fitting function and execute a second loop to minimize the sum of all the root mean square errors.

In one embodiment, the processor is configured to shift a fitting function of each of the plurality of spot images so as to superimpose the fitting function corresponding to each spot image to obtain co-registered fitting functions. In some embodiments, the fitting function is a two-dimensional Gaussian fitting function. In various embodiments, the remote sensor system is located on an aircraft or a satellite. In certain embodiments, the spatial characteristic of the remote sensor system is determined from the point spread function of the remote sensor system.

In some embodiments, the spatial characteristic comprises a spatial resolution of the remote sensor system. In one embodiment, the spatial resolution of the remote sensor system is determined from the full width at half maximum of the fitting function.

Another aspect of the present disclosure is directed to a method for vicarious spatial characterization of a remote sensor system. The method includes detecting, by the remote sensor system, solar glint reflected by a body of water as a plurality of spot images, analyzing the plurality of spot images by executing an algorithm for fitting the spot images to obtain a point spread function of the remote sensor system, fitting each of the plurality of spot images using a fitting function, determining a root mean square error of the fitting function for each of the plurality of images to obtain a plurality of root mean square errors, calculating a sum of all the root mean square errors, minimizing the sum of all the root mean square errors to obtain a point spread function of the remote sensor system, and fitting each of the plurality of spot images without varying a full width at half maximum parameter of the fitting function and minimizing the sum of all root mean square errors.

In one embodiment, the method includes shifting a fitting function of each of the plurality of spot images to superimpose a fitting function corresponding to each spot image to obtain co-registered fitting functions. In some embodiments, the method includes determining a spatial characteristic of the remote sensor system from the point spread function of the sensor. In certain embodiments, determining the spatial characteristic includes determining a spatial resolution of the remote sensor system. In various embodiments, determining the spatial resolution comprises determining the spatial resolution from the full width at half maximum of the fitting function.

Another aspect of the present disclosure is directed to a computer program product comprising a non-transitory computer readable medium having instructions stored thereon which, when executed by a processor, carries out functions including fitting each of a plurality of spot images using a fitting function, determining a root mean square error of the fitting function for each of the plurality of images to obtain a plurality of root mean square errors, calculating a sum of all the root mean square errors, minimizing the sum of all the root mean square errors to obtain a point spread function of the remote sensor system, and fitting each of the plurality of spot images without varying a full width at half maximum parameter of the fitting function and minimizing the sum of all the root mean square errors.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
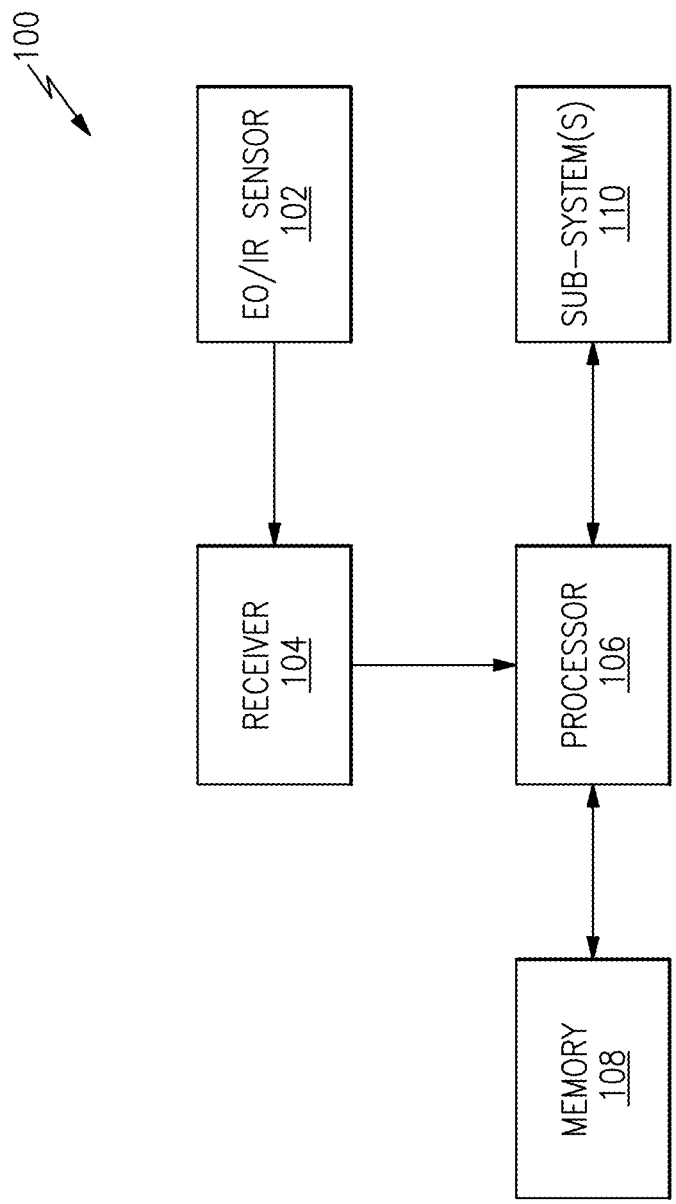
FIG. 1 is a block diagram of a remote sensor system in accordance with aspects described herein.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, airborne and space based imaging and spectral remote sensor systems can be used to measure physical properties of the Earth. For example, remote sensor systems may be used for geospatial survey, observation, target recognition, and other surveillance applications. In order for the remote sensor systems to operate as intended to quantify physical properties of observed objects, the image data obtained by the remote sensor system and the physical properties of the observed object are quantitatively linked. Thus, providers of remote sensor systems strive to provide adequate methods for addressing stability and accuracy to define and validate sensor spectral, spatial, and radiometric performance to establish a level of confidence for data exploitation.

Development of panchromatic and multispectral sensing systems continues to move toward increasing spatial resolution in response to the fact that most targets of interest are contained in only a few pixels or even sub-pixel (i.e., an image area of the target is less than a pixel area). Generally, each image is composed of a plurality of pixels, with the radiation sensed by each pixel analyzed to determine the physical content and make-up of the target contained in a pixel area. However, for small targets, blur spots due to optical diffraction, electronic readout, sensor motion, atmospheric scattering, or any combination thereof, as well as other potential natural phenomena or technical issues, can smear light into nearby pixels spatially disconnected from the target and thus blur the image of the object. Multispectral and hyperspectral sensors collect image data across a plurality (e.g., tens to hundreds) of spectral bands in which the blurring or smearing effect can vary with wavelength.

As a result, knowledge of the spatial performance (i.e., sensor point response function, PRF) is applied as part of a calibration process to support the detection of small targets. Hence, one element in the operation of airborne and space-borne imaging systems is sensor calibration on the ground before launch or flight. However, physical conditions within the imaging system or conditions in the atmosphere between the imaging system and the desired target or object may change from the calibration laboratory setting and the calibration values may become skewed. For example, the calibrations may be affected by temperature, vibration, and/or shock. Therefore, the sensor characterization on the ground in the laboratory becomes suspect until validated after deployment of the sensor. The validation of the characterization after sensor deployment or vicarious characterization of the sensor provides absolute information of the sensor characteristics to ensure validity of the laboratory or ground based characterization or to correct the laboratory characterization to consider conditions that may have occurred after deployment of the sensor.

As such, remote sensors systems are typically calibrated to improve spectral, radiometric, and/or spatial accuracy after initial launch and periodically during operation. For calibration purposes, the spectral response of the sensor system can be measured vicariously using atmospheric absorption lines and the radiometric response of the sensor system can be measured vicariously using measured solar, atmospheric, and terrestrial data at well characterized locations. In some cases, to measure the spatial response of the sensor system, targets may be placed at static locations around/across the observation area (e.g., the Earth).

Several approaches using static targets to measure the spatial response of remote sensor systems are described in U.S. Pat. No. 8,158,929 to Schiller titled "SPECULAR ARRAY FOR RADIOMETRIC CALIBRATION AND METHOD" and U.S. Pat. No. 9,068,886 to Silny et al. titled "METHOD AND SYSTEM FOR VICARIOUS SPATIAL CHARACTERIZATION OF A REMOTE IMAGE SENSOR," which are hereby incorporated herein by reference. As described in the Schiller and Silny patents, spherical mirrors are used to reflect sunlight into the sensor in flight, creating point sources. The sensor then images these point sources and calculates a point spread function (PSF) response. Corrections may then be applied to improve the focus of the sensor.

While these systems and methods of spatial calibration can be used to accurately calibrate remote sensors, it may be desired to use alternative systems and methods for spatial calibration that do not rely on physical targets (e.g., mirrors) placed in static locations. Hence, to avoid the physical limitations and costs associated with artificial point sources, it may be advantageous to use naturally occurring point sources for spatial calibration.

Accordingly, systems and methods for vicarious calibration of remote sensors using naturally occurring point sources are provided herein. In at least one embodiment, a remote sensor is configured to detect solar glint from random wave action while over at least one body of water. In some examples, the solar glint is used as point sources to calculate point spread functions for spatial calibration of the remote sensor. In certain examples, corrections can be made based on the calculated point spread functions to remove fine focus or wavefront errors, relieve pre-launch tolerances, and extend the service life of the remote sensor.

FIG. 1 illustrates a functional block diagram of a remote sensor system 100 in accordance with aspects described herein. In one example, the remote sensor system 100 includes an EO/IR sensor 102, a receiver 104, a processor 106, a memory module 108, and one or more optional sub-systems 110.

In one example, the EO/IR sensor 102 is configured to operate in a single frequency band; however, in other examples, the EO/IR sensor 102 may operate over multiple frequency bands. For example, the EO/IR sensor 103 may detect radiation in various wavelengths or wavelength ranges including the wavelength range between about 0.4 μm and about 15 μm which includes the visible range (between about 0.4 μm and about 0.7 μm), the near infrared range (between about 0.7 μm and about 1.4 μm), the short wavelength infrared range (SWIR) (between about 1.4 μm and about 3 μm), the mid-wavelength infrared range (MWIR) (between about 3 μm and about 8 μm), and at least a portion of the long-wavelength infrared range (LWIR) (between about 8 μm and about 15 μm). In some examples, EO/IR sensor 102 can also be configured to detect radiation in the ultraviolet wavelength range or even in the 40 millimeter range or radio frequency range if desired.

In some examples, the EO/IR sensor 102 is configured to provide one or more focal planes for capturing target positions or images at various points in time. The EO/IR sensor 102 provides data to the receiver 104 corresponding to electrical signals representing the images in the one or more focal planes of the EO/IR sensor 102. The receiver 104 is configured to condition the data received from the EO/IR sensor 102 and provide the conditioned data to the processor 106 for further processing (e.g., imaging, target tracking, etc.) and/or storage in the memory module 108.

The optional sub-systems 110 may include one or more sub-systems configured to provide additional imaging/tracking capabilities. For example, the additional sub-systems 110 can include a laser rangefinder system, a global positioning system (GPS), etc. In certain examples, the additional sub-systems 100 may include a reference system configured to provide position and orientation information associated with the EO/IR sensor 102 to the processor 106.

In various examples, the processor 106 may include one or more general computing processors, specialized processors, or microcontrollers. The processor 106 may include programmed, special-purpose hardware, for example, an application-specific integrated circuit (ASIC), or more generally designed hardware, such as a field programmable gate array (FPGA) or a general-purpose processor. In one example, the memory module 108 may include one or more memory devices, such as a disk drive, memory, flash memory, embedded or on-chip memory, or other device for storing data.

Figure 2:
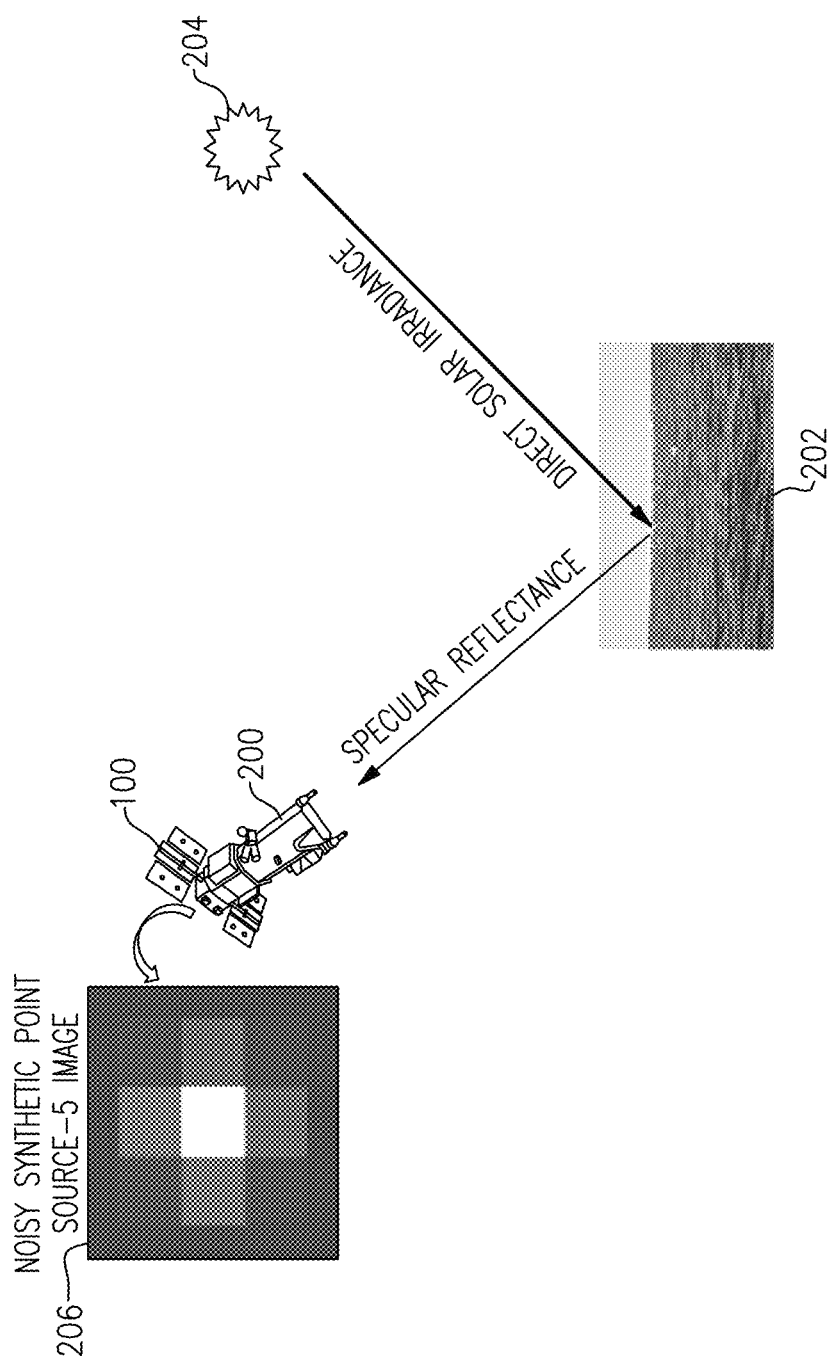
FIG. 2 is a diagram illustrating operation of a remote sensor system in accordance with aspects described herein.

FIG. 2 illustrates a vehicle 200 configured to provide imaging and/or surveillance capabilities in accordance to aspects described herein. In some examples, the vehicle 200 corresponds to an airborne or space-based vehicle (e.g., aircraft, satellite, etc.). As shown, the vehicle 200 may include the remote sensor system 100 of FIG. 1; however, in other examples, the vehicle 200 may include a remote sensor system with a different configuration.

In one example, the vehicle 200 may travel over, near, or in proximity to a target area or area of surveillance. For example, an aircraft may fly over/near an area of surveillance and a satellite may orbit around the area of surveillance (e.g., the Earth). As such, during periods of flight/orbit, a body of water 202 may enter the field of view of the vehicle 200 (i.e., the remote sensor system 100). In one example, the body of water 202 may enter the field of view of the vehicle 200 when a direct line of sight is established between the vehicle 200 and the body of water 202. In some examples, the vehicle 200 may not be over or near the body of water, however, the sensor system 100 can be directed (or steered) such that there is a direct line sight field between the vehicle 200 and the body of water 200. The body of water 202 may be an ocean, lake, river, pool, pond, sound, channel, river, or any other body of water in the field of view of the vehicle 200 (i.e., the remote sensor system 100). In certain examples, the body of water 202 may correspond to multiple bodies of water (e.g., two lakes in the field of view of the remote sensor system 100).

As shown, a light source 204 (e.g., the sun) may direct light towards the body of water 202. In one example, the direct solar irradiance from the light source 204 is reflected off the body of water 202 towards the vehicle 200. In some examples, the solar irradiance is reflected off the body of water 202 as a specular reflection (i.e., solar glint) that behaves similarly to a mirror-like reflection. Depending on the type or state of the body of water 202, the solar glint may correspond to a plurality of point reflectors having a variety of spectral properties and characteristics. For example, the randomness of wave facet angle and wave size may increase the spectral diversity (e.g., spectrum, size, brightness, etc.) of the plurality of point reflectors viewed by the remote sensor system 100. In one example, any bright source surrounded by a dark background acts as a point source if the area of the source remains subpixel in extent. Thus, wave facets can act as a point source via specular reflectance if the orientation of the wave facet normal bisects the angle between the light source 204 and the remote sensor system 100, as long as the extent of the wave facet or group of wave facets is subpixel and surrounded by a non-solar specular reflected dark background (e.g., reflected sky irradiance). In some examples, when the orientation of the wave facet normal bisects the angle between the light source 204 and the remote sensor system 100 within $\frac{1}{4}^{th}$ of a degree, a mirror-like reflectance of the direct solar irradiance is provided.

In certain examples, whitecaps can act as a point source in addition to wave facets. In this context, whitecaps correspond to weakly absorbing, highly light-scattering media that occur under certain wind conditions (e.g., wind speeds around 3 m/s or greater). Under such wind conditions, waves can break and entrain air in the water which subsequently breaks up into bubbles which rise to the surface. As such, a highly reflective diffuse scattering foam that can act as a point source is created, as long as the area of the foam is subpixel.

In some examples, each point reflector reflects radiation towards the remote sensor system 100 and the image of each point reflector appears as a distinct point image or spot within the captured or acquired imaged data (e.g., the image 206). In one example, the size of each spot within the image 206 can be about the size of one pixel of the remote sensor system 100. As such, in some instances, each spot may be captured by a single pixel. However, in other instances, the spot may be captured by more than one pixel. In such cases, each pixel of the remote sensor system 100 may contain only a portion of a spot. In addition, if the remote sensor system 100 is experiencing an anomaly, or is simply out of focus, the spots may be large and blurry. As a result, a sharpness of the image 206 or the spatial resolution of the image 206 may be affected.

Figure 3:
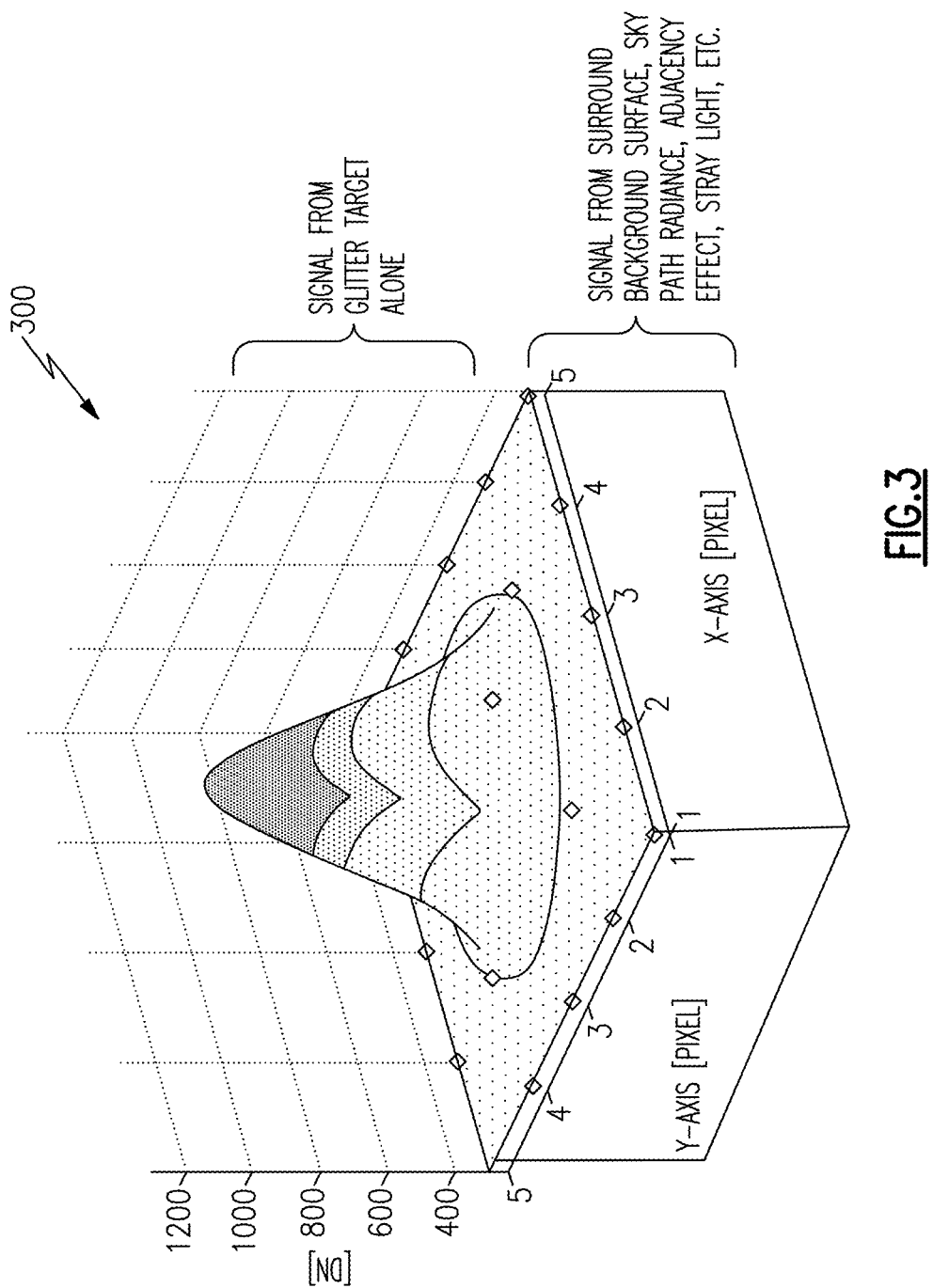
FIG. 3 is a three-dimensional plot of a point reflector in accordance with aspects described herein.

FIG. 3 illustrates a three-dimensional (3D) plot 300 of a point reflector image. In one example, the 3D plot 300 represents the pixel intensities of the image 206 collected by the remote sensor system 100. In some examples, the 3D plot 300 corresponds to a 16 pixel array (e.g., 4 by 4 grid); however, in other examples, different pixel configurations and array/grid sizes may be used for the remote sensor system 100 (i.e., the EO/IR sensor 102 or the receiver 104). As shown, at least a portion of the intensity of each pixel corresponds to surround background surface, sky path radiance, adjacency effect, and/or stray light. As described above, the spot(s) corresponding to the point reflector(s)

may be captured by one or more pixels. For example, in the plot 300 the signal corresponding to the point reflector is primarily captured by a group of 4 pixels.

Figure 4:
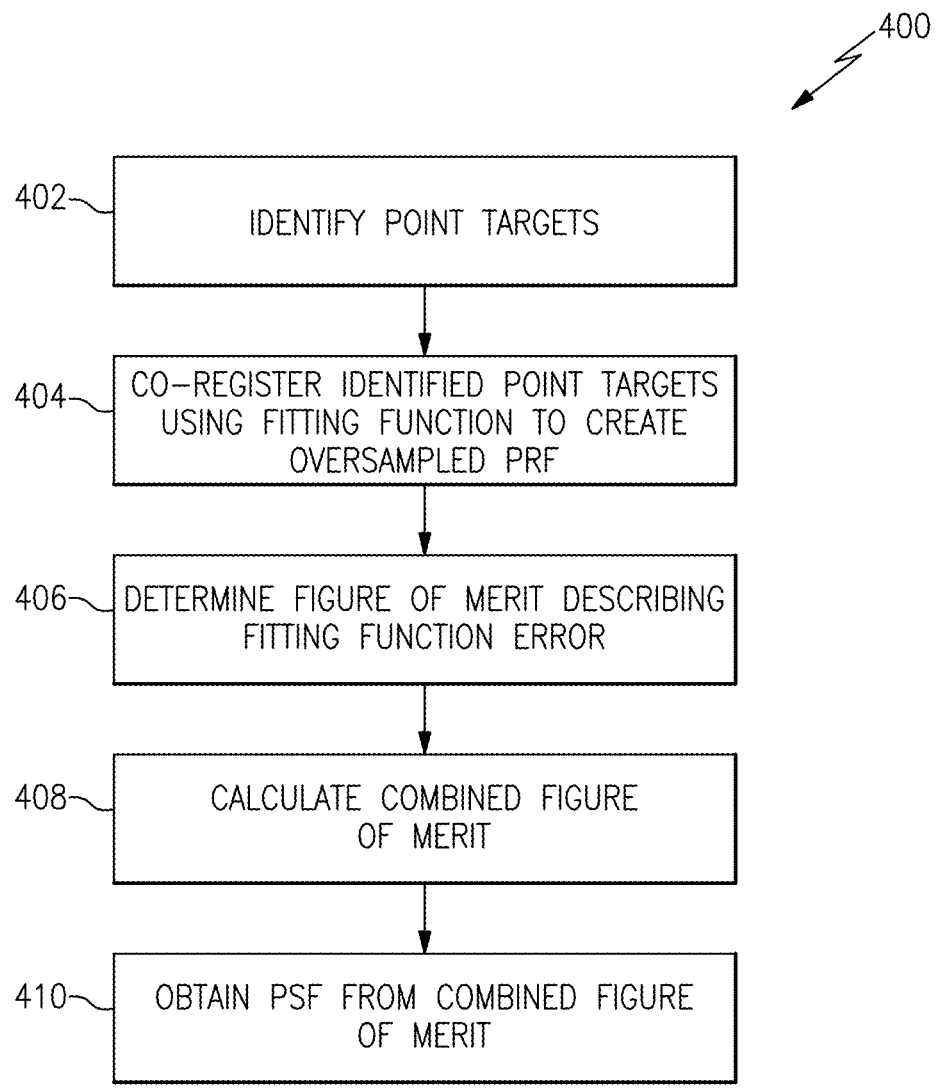
FIG. 4 is a flow diagram of a method for quantifying spatial resolution in accordance with aspects described herein.

FIG. 4 is a flow diagram of a method 400 for quantifying spatial resolution in accordance with aspects described herein. In one example, the method 400 may be implemented by the processor 106 of FIG. 1; however, in other examples, the method 400 can be implemented by a different processor, controller, or computing system.

In some examples, to quantify the image sharpness or spatial resolution, the image 206 is analyzed by an algorithm (described below) that first identifies the point targets (e.g., specular facets or whitecap targets) in the spatial analysis image. Once identified, the algorithm optimally co-registers the spots (i.e., the images of the different point targets) under the assumption that the resolution is shift invariant over the set of identified targets to provide oversampling of the two-dimensional (2D) system point response function (PRF) of the remote sensor system 100. In one example, the assumption of shift invariance means that the full width at half maximum (FWHM) of the PRF is a constant in the identified set of point targets for creating an oversampled PRF profile. In some examples, the 2D spatial characteristics or performance of the remote sensor system 100 can be extracted from the optimally registered system PSF. For example, the effects of optical aberrations in the optics used in the remote sensor system 100 or defects in the image sensor itself (e.g., the EO/IR sensor 102) in remote sensor system 100 can be quantified.

At block 402, the processor identifies a plurality of point reflector images representing subpixel point sources. In one example, the algorithm may implement a model for identifying potential point targets and co-registering the image set of different point reflectors. The term "co-registering" is used herein to mean that the images of the different point reflectors or spots are superimposed to a common centroid. In one example, the model may be a 2D Gaussian model or based on a 2D Gaussian function. For example, in a 2D Gaussian model, the spot or PRF of each point reflector on the image is assumed to have a Gaussian shape. Although the algorithm will be described herein with reference to a Gaussian model, it should be appreciated that any other mathematical model or 2D function can be used, such as, but not limited to, a Lorentzian function. Alternatively, instead of using a function (e.g. a Gaussian function, a Lorentzian function, etc.), a look-up table may be used.

For example, in the case of a 2D Gaussian model, the following function (1) can be used:

$$z(x, y) = a\exp\left\{-\alpha\left[\left(\frac{x-b_x}{c_x}\right)^2 + \left(\frac{y-b_y}{c_y}\right)^2\right]\right\} + d, \quad (1)$$

where, a is the amplitude, α is a scaling constant where 4 ln(2) yields full width at half maximum (FWHM), $b_x$ is the center position of the spot in the x-direction on the image, $b_y$ is the center position of the spot in the y-direction on the image, $c_x$ is the width (FWHM) of the spot in the x-direction, $c_y$ is the width (FWHM) of the spot in the y-direction, and d is the offset or background signal in the image.

Although in the 2D Gaussian model it is assumed, by only using an offset parameter d, that the background is relatively flat and does not vary in the x-direction and y-direction, the offset parameter d can be augmented with a sloped term in x-direction, in y-direction, or both. In some examples, higher order terms can also be used to account for variability in the background.

In some examples, the identification of potential point targets is accomplished through image processing by first identifying the smallest targets in the image that may represent a point source and applying a regression fitting of function (1) to estimate the FWHM of each. For example, the potential target may correspond to a compact blob surrounded by a uniform background that fits within a selected square window of W pixels in width. As described above, the compact blob may be produced by specular reflectance from a group of wave facets and/or whitecaps.

In one example, the window width can be estimated using a ceiling function, such as the following function (2):

$$\lceil W \rceil = \min\left\{n \in Z_{odd} \mid n > \frac{S\lambda\left(\frac{f}{D}\right)}{p}\right\}, \quad (2)$$

where, λ is the band wavelength, f is the sensor effective focal length, D is the optical aperture diameter, p is the focal plane detector pitch, and S is the window pixel scale factor. In some examples, the function (2) minimizes n from the set of odd integers, $Z_{odd}$, and S is selected by the processor depending on how cluttered the isolated image blobs are to identify a desired number of point targets in the scene needed to create an oversampled profile.

Figure 5:
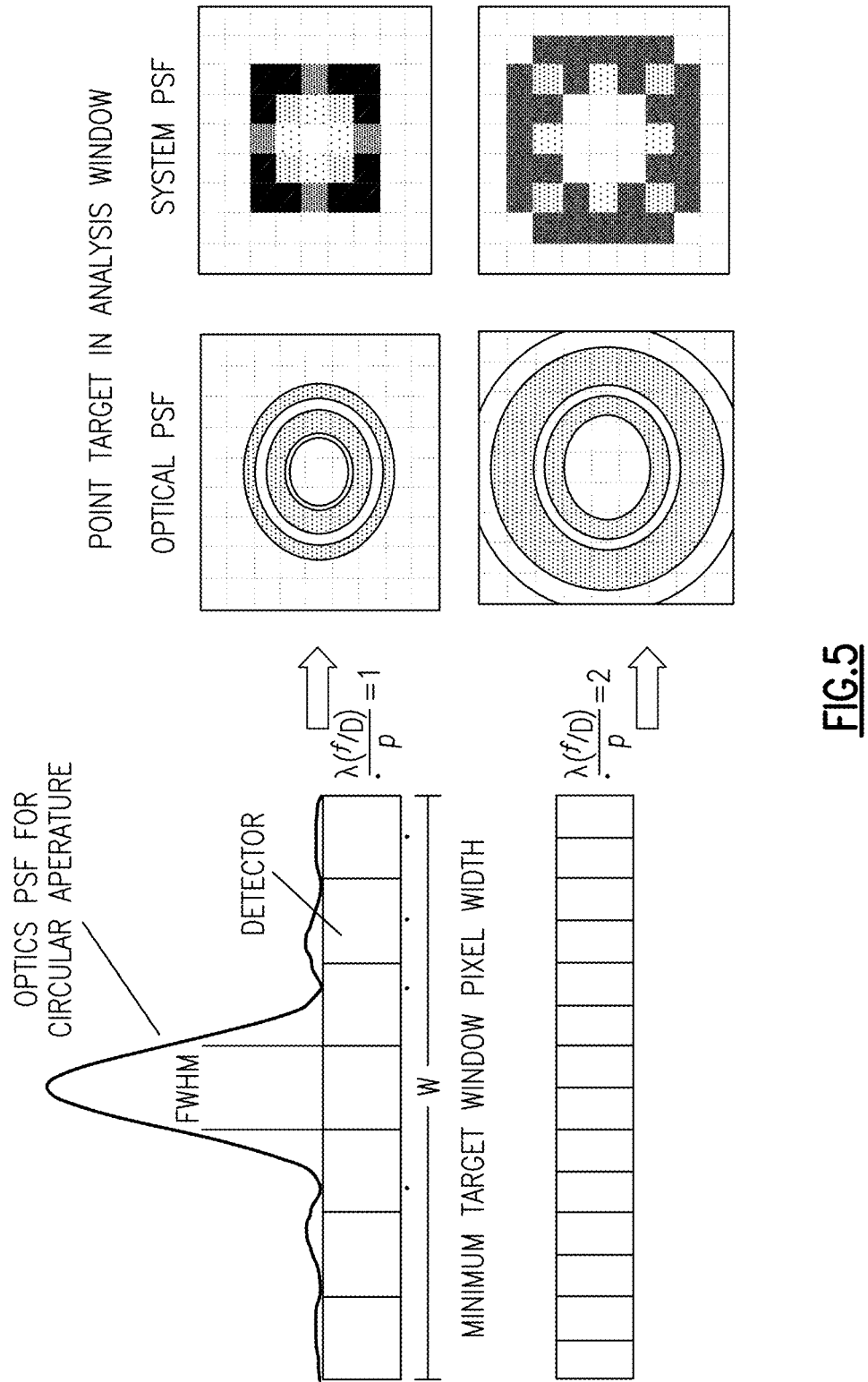
FIG. 5 is a diagram illustrating a process for estimating a window size for a sensor point spread function in accordance with aspects described herein.

In certain examples, the function (2) can be used to estimate the minimum window size needed to encapsulate the sensor PSF plus background. For example, FIG. 5 illustrates a process for estimating the minimum window size for the sensor PSF plus background. In one example, a Gaussian characterization is used as the PSF for a circular aperture (e.g., Airy disk) to estimate the minimum window size. The ratio [λ(f/D)]/p of function (2) indicates the number of pixels that fit the FWHM of the Airy disk for a diffraction-limited incoherent optical system with a circular unobstructed aperture. Thus, if [λ(f/D)]/p=1, then the FWHM of the central diffraction peak is 1 pixel wide. Likewise, if [λ(f/D)]/p=2, then the FWHM of the central diffraction peak is 2 pixels wide, and so on. As such, if the FWHM is 1 pixel wide, a value of S=7 identifies a window of width W=7 pixels. When the target is centered, the perimeter pixels of the window will be just beyond the second minimum of the Airy disk and those pixels can be used to represent the background. Relative to the PSF, a slightly larger window may be needed to encapsulate the PRF which includes additional sources of blur under operational conditions (e.g., spacecraft motion, poor focus, etc.).

Figure 6:
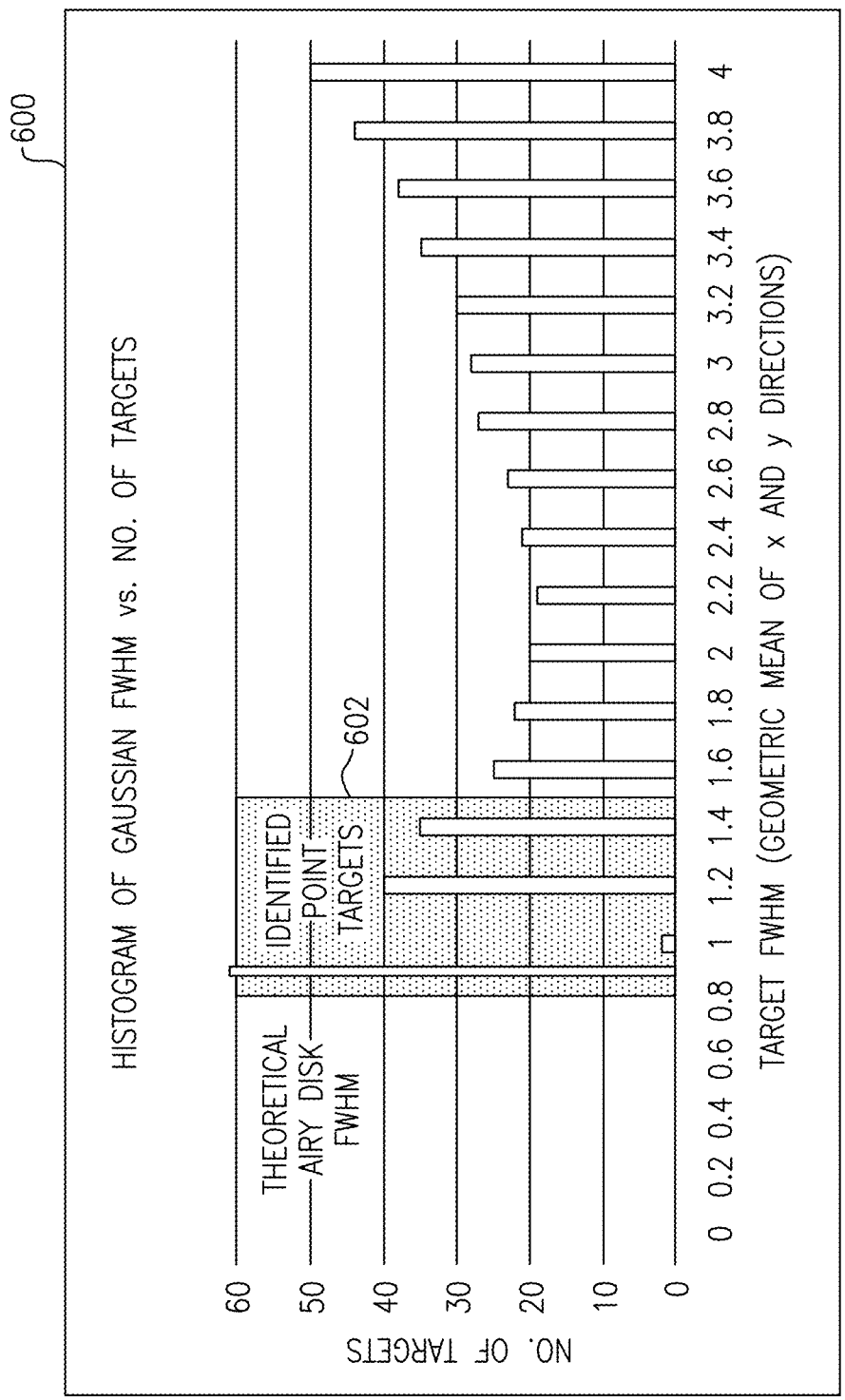
FIG. 6 is a histogram of example FWHM values calculated for potential point targets in an image in accordance with aspects described herein.

Once the minimum window size has been determined, the window of width W is moved over all potential point targets in the image. For each potential point target, function (1) can be fit to the image profile and used to calculate the FWHM for each target. FIG. 6 illustrates an example histogram 600 of FWHM values calculated for all potential point targets in the image. As shown in the histogram 600, a minimum cutoff peak is revealed that identifies the targets that represent subpixel point sources (indicated by shaded region 602).

At block 404, the processor co-registers each of the selected point reflector images using a fitting function. In one example, the selected targets representing subpixel point sources are co-registered and used to create the oversampled PRF of the sensor system 100. In some examples, the selected point targets can be used to create the oversampled PRF if the intrinsic PRFs of the selected targets are substantially the same and any variations in FWHM are from response noise or pixel phasing sampling.

Figure 7:
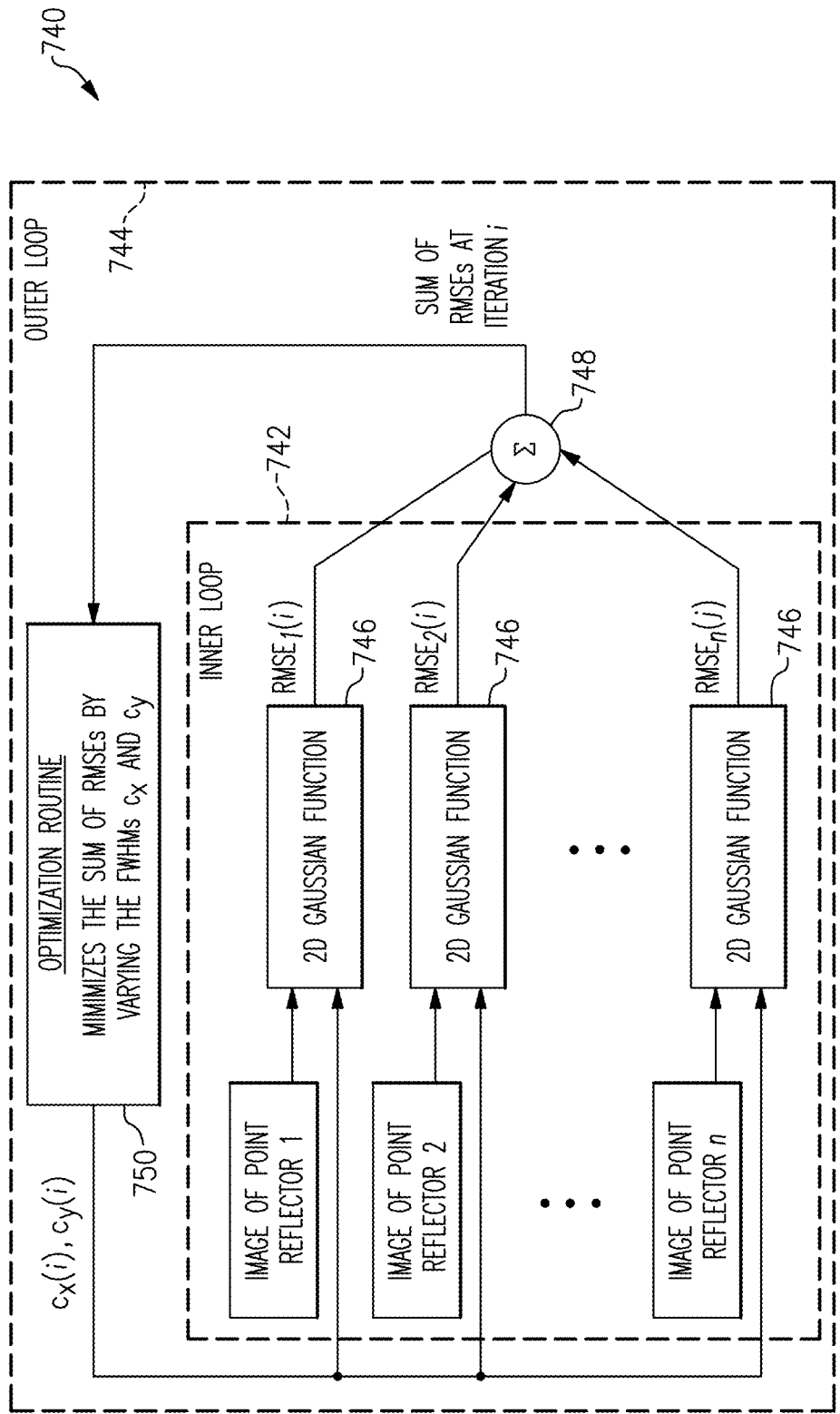
FIG. 7 is a flow diagram of an algorithm to optimally co-register different point reflector images in accordance with aspects described herein.

FIG. 7 illustrates a flow diagram of an algorithm to optimally co-register the selected point reflectors (i.e., targets) in accordance with aspects described herein. In one example, the algorithm runs two loops, an inner loop 742 and an outer loop 744. In the inner loop 742, for each image of point reflectors, i.e., for each spot on the image (image of point reflector 1, image of point reflector 2, ... image of point reflector n), a fitting procedure is run using a 2D Gaussian fitting function 746 (e.g., function (1)) to determine the best fitting parameters a, $b_x$, $b_y$, and d of the Gaussian function (1) for each of the spots (image of point reflector 1, image of point reflector 2, ... image of point reflector n), i.e., to determine the best fitting Gaussian shape for each individual spot. Hence, in the inner loop 742, parameters a, $b_x$, $b_y$, and d in the 2D Gaussian function are allowed to freely vary during the fitting procedure to find the best fitting 2D Gaussian shape for each spot, individually. Parameters $c_x$, $c_y$, which represent the FWHM, may be fixed within the inner loop 742. For example, the parameters $c_x$, $c_y$, can be initially approximated and initial values can be provided to run the fitting procedure.

At block 406, the processor determines a figure of merit describing an error of the fitting function for each of the selected point reflector images to obtain a plurality of figures of merit. In one example, for each 2D Gaussian fit function 746 associated with a corresponding spot (image of point reflector 1, image of point reflector 2, ..., image of point reflector n) a root mean square error (RMSE) is determined. However, other figures of merit (such as the sum of absolute differences) may also be used. For example, for the image of point reflector 1, a best fit 2D Gaussian function can be determined and the $RMSE_1(i)$ of the best fit can be quantified. Similarly, for the image of point reflector 2, a best fit 2D Gaussian function can be determined and the $RMSE_2(i)$ of the best fit can be quantified. Hence, for the image of point reflector n, a best fit 2D Gaussian function can be determined and the $RMSE_n(i)$ of the best fit can be quantified.

At block 408, the processor calculates a combined figure of merit from the plurality of figures of merit. In one example, the various RMSEs ($RMSE_1(i)$, $RMSE_2(i)$, ..., $RMSE_n(i)$) of the various 2D Gaussian fit functions can be summed with summation operation 748 to obtain the sum of all RMSEs ($RMSE_1(i) + RMSE_2(i)$, ..., $+RMSE_n(i)$). Although not shown, a weighted summation or other mathematical operation can be used to account for a total fit error across all fits. In the outer loop 744, an optimization procedure 750 is implemented where the sum of all RMSEs is minimized by varying the FWHM parameters $c_x$, $c_y$ of each 2D Gaussian function best fit for each spot (image of point reflector 1, image of point reflector 2, ... image of point reflector n). In some examples, the optimization procedure 750 converges to obtain a minimum of the sum of all RMSEs.

Figure 8:
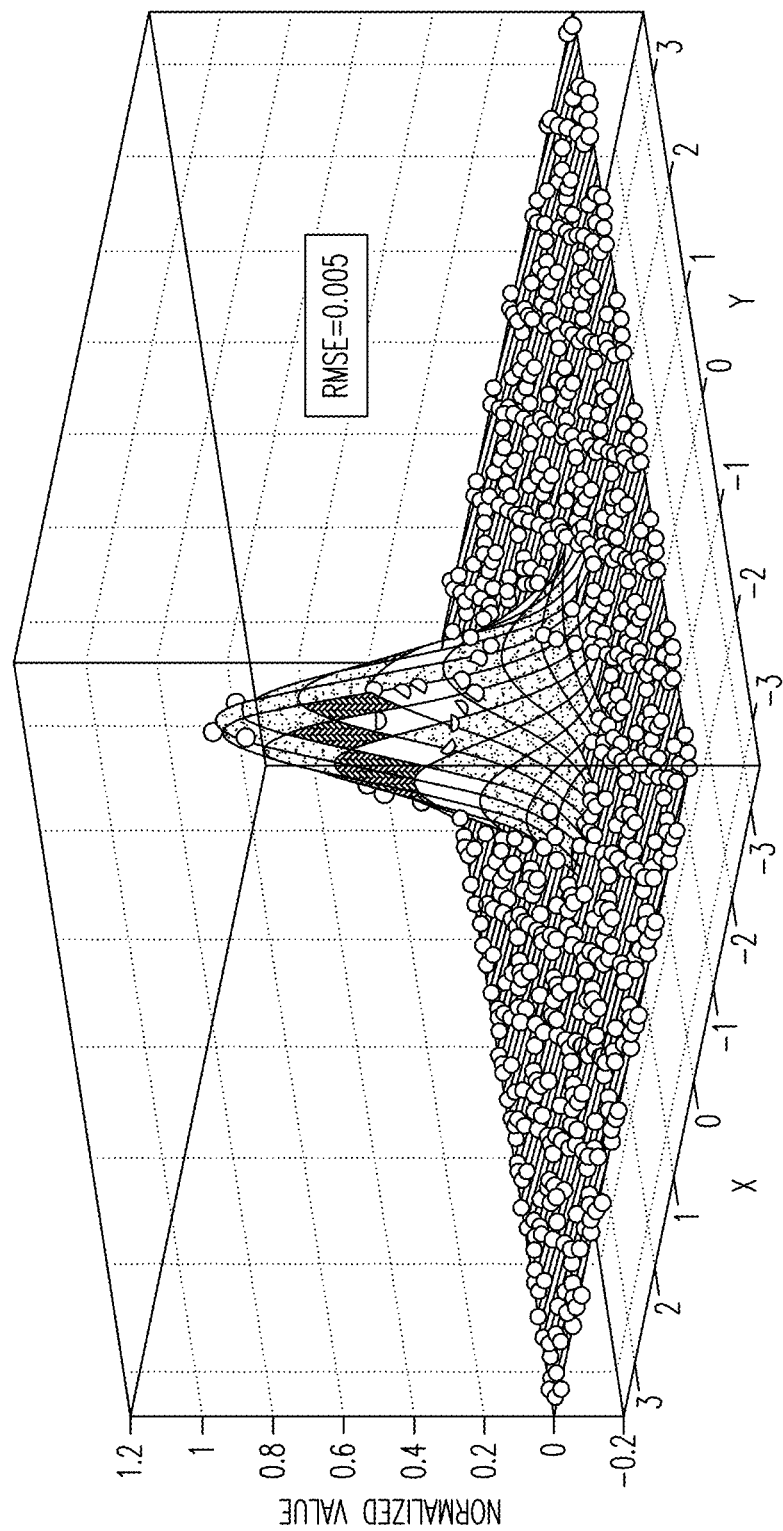
FIG. 8 is a three-dimensional plot of a figure of merit of co-registered point reflector images in accordance with aspects described herein.

At block 410, the processor minimizes the combined figure of merit to obtain a point spread function of the remote sensor system 100. In some examples, the 2D Gaussian fit functions corresponding to each spot image (image of point reflector 1, image of point reflector 2, ..., image of point reflector n) can be displayed together on the same three dimensional (3D) plot and fit with a final 2D Gaussian function. For example, FIG. 8 illustrates a 3D plot where the data points of each spot image are shifted in the x-direction and the y-direction to a single position, for example, to an origin (0,0) to superimpose and co-register the images of each point reflector within the image. In some examples, the shift to the origin can be done by subtracting the fit parameters $b_x$ and $b_y$ from each set of data points. As shown in FIG. 8, the final obtained RMSE after co-registering the different spots is equal to approximately 0.005 (i.e., 0.5%). As a result, an accurate composite registered PSF can be obtained from a plurality of point reflector images. Any number of point reflector images can be used, however, as it can be appreciated, using a greater number of point reflector images allows one to obtain a more accurate vicarious characterization of the remote sensor system 100.

Figure 9:
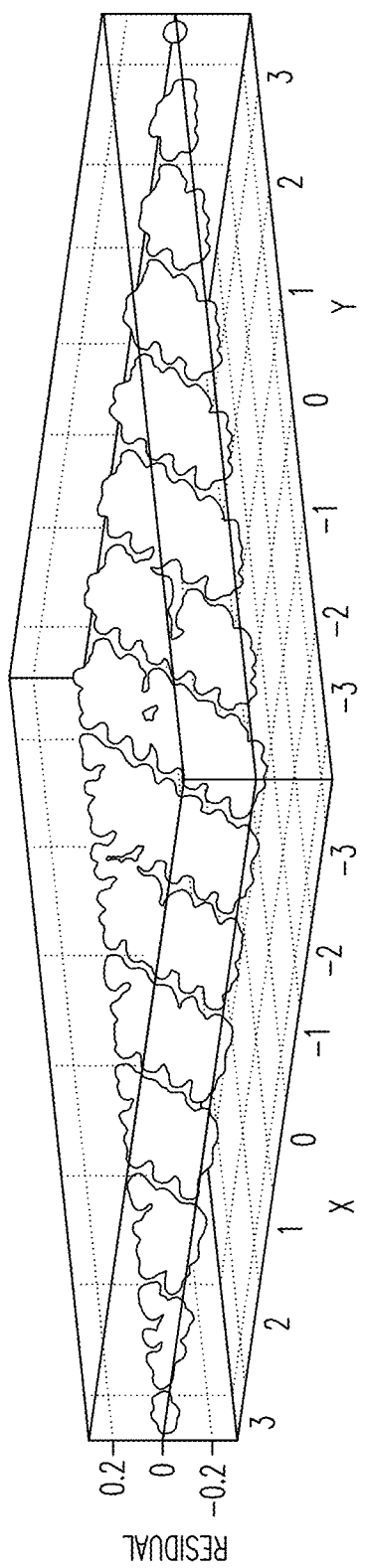
FIG. 9 is a three-dimensional plot of the residual value for the figure of merit of FIG. 8 in accordance with aspects described herein.

FIG. 9 illustrates a plot of the residual value, i.e., the difference between the measured intensity value and the fitted or calculated intensity value, as a function of x and y for the 2D Gaussian fit shown in FIG. 8. As shown in FIG. 9, the residual value is substantially flat and equal to approximately zero showing that the fit obtained using the 2D Gaussian function is a good fit.

Figure 10A:
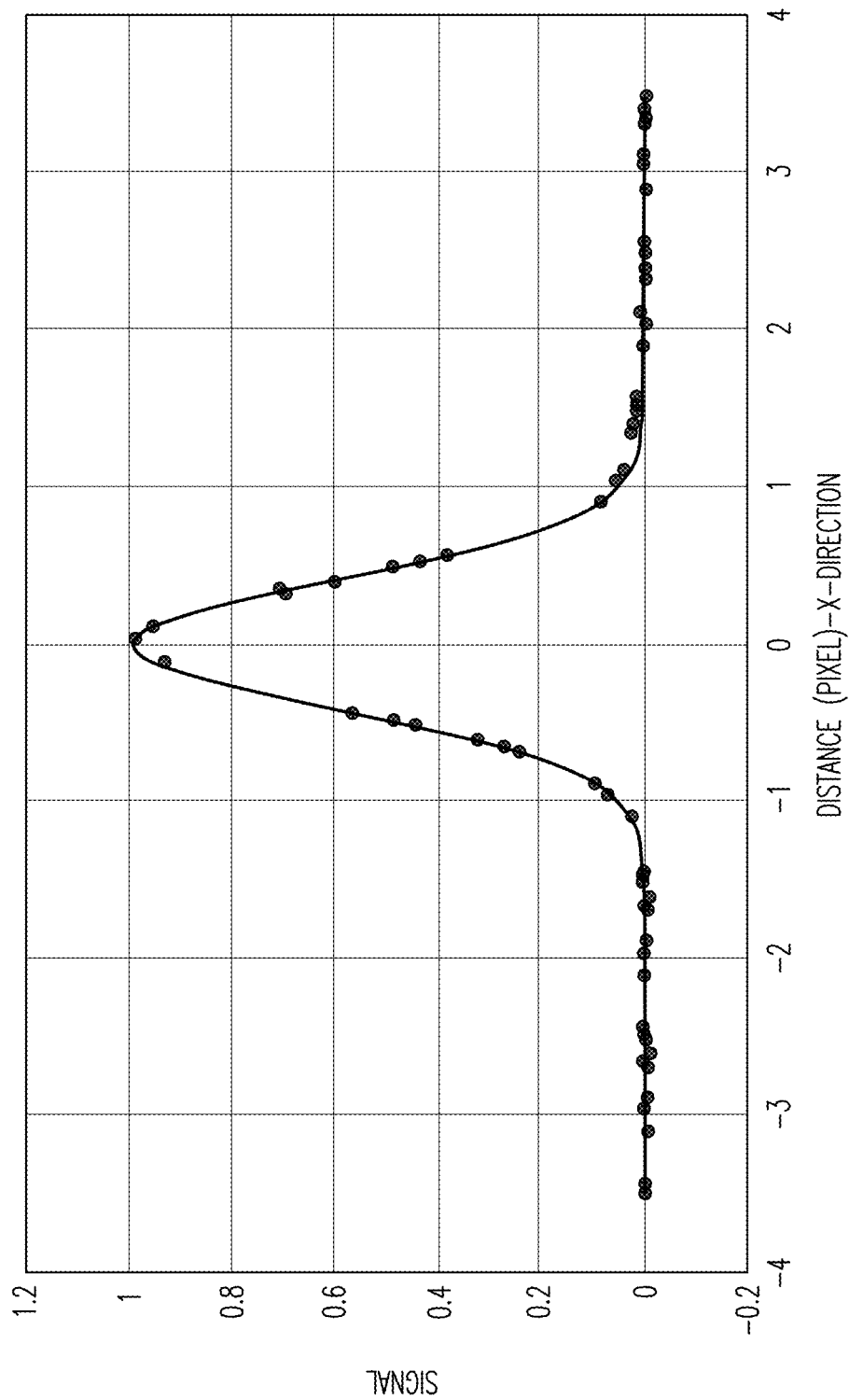
FIG. 10A is two-dimensional plot of a response function curve fit along the x-direction in accordance with aspects described herein.
Figure 10B:
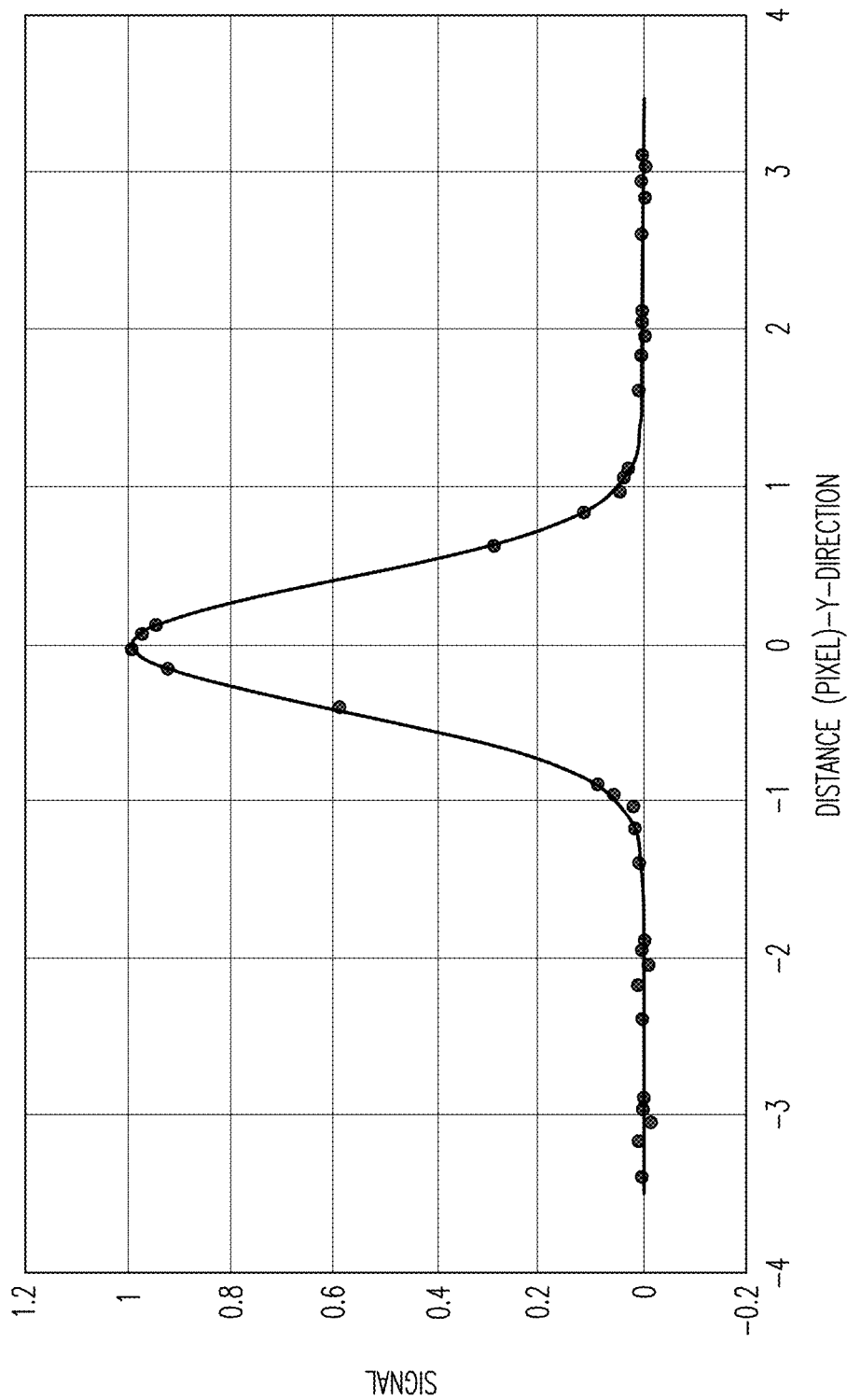
FIG. 10B is two-dimensional plot of a response function curve fit along the y-direction in accordance with aspects described herein.

FIGS. 10A and 10B illustrate a plot of a response function curve fit along the x-direction and the y-direction, respectively, in accordance with aspects described herein. FIG. 10A is 2D plot of a one-dimensional (1D) Gaussian function fit in the x-direction (function (2)) and FIG. 10B is a 2D plot of a 1D Gaussian function fit in the y-direction (function (3)).

In one example, the Gaussian fit function (2) and parameters for the plot shown in FIG. 10A are as follows:

$$z = a\exp\left[-\alpha\left(\frac{x}{c}\right)^2\right], \tag{2}$$

where, $\alpha = 2\ln(4) \approx 2.77$, $a = 0.99 \pm 0.004$, $c = 0.96 \pm 0.004$ pixels, and the obtained RSME for the fit shown in FIG. 10A is approximately 0.0077.

In one example, the Gaussian fit function (3) and parameters for the plot shown in FIG. 10B are as follows:

$$z = a\exp\left[-\alpha\left(\frac{y}{c}\right)^2\right], \tag{3}$$

where, $\alpha = 2\ln(4) \approx 2.77$, $a = 0.99 \pm 0.005$, $c = 0.93 \pm 0.007$ pixels, and the obtained RSME for the fit shown in FIG. 10B is approximately 0.0091.

The RMSE value indicates the extent to which the fit of the individual point reflector images converge to obtain a minimal RMSE value. In addition, the 1D or 2D PSF of the optimally registered system provides the information on the spatial resolution of remote sensor system 100. For example, if the FWHM of the fit function is P pixel (e.g., one pixel), two adjacent image point reflectors or spots can be resolved if the spacing between the centers of the point reflector images (i.e., maxima of the functions fitting the point reflector images) is greater or equal to 2P pixels (e.g., two pixels). Other separation distances, such as that described by the Rayleigh criterion, can be used to define the minimum separation required for two point sources (e.g., point reflectors) to be spatially resolved. As it can be appreciated, the unit pixel can be converted into dimensional length, such as meter, inch, foot, or any desired dimensional unit. Therefore, by determining the FWHM or the c-parameter (parameter $c_x$, parameter $c_y$, or both) of the fit function, the resolution of the remote sensor system 100 can be quantified.

Furthermore, the system PSF can be converted to the spatial frequency domain and represented as a modulation transfer function (MTF). Further mathematical transformation can yield an edge response function for the x-dimension and y-dimension from which a relative edge response (RER) metric can be calculated. Such a metric is ideal for use within a general image quality equation (GIQE) for national image interpretability rating scale (NIIRS) validations. The present system and method further provides the ability to measure spatial resolution over a broad wavelength range (e.g., from ultraviolet to LWIR and beyond depending on the application sought for the remote sensor system 100).

In some examples, the spatial characteristic(s) (e.g. resolution) of the remote sensor system 100 can be used to calibrate the remote sensor system 100. For example, the system PSF can be monitored relative to a normal threshold range (or tolerance). If the system PSF is determined to be outside the normal threshold range, the spatial characteristic(s) can be used to calibrate the remote sensor system 100. In one example, calibrating the remote sensor system 100 includes adjusting the focus of the remote senor system 100 based on the spatial characteristic(s) in response to the system PSF being outside the normal threshold range. In some examples, if the system PSF is determined to within the normal threshold range, the remote sensor system 100 may continue to operate with the existing or previous calibration applied. The system PSF may be continuously or periodically monitored to detect deviations of the system PSF outside of the normal threshold range. In certain examples, the monitoring and calibration performed by the processor 106; however, in other examples, the monitoring and/or calibration can be implemented by a different processor, controller, or computing system.

It should be appreciated that the point reflectors (i.e., solar glint) may correspond to spectral reflections over a wide wavelength spectrum including, without limitation, the wavelength range between about 0.4 μm and about 15 μm which includes the visible range (between about 0.4 μm and about 0.7 μm), the 60 near infrared (NIR) range (between about 0.7 μm and about 1.4 μm), the short wavelength infrared (SWIR) range (between about 1.4 μm and about 3 μm), the mid-wavelength infrared (MWIR) range (between about 3 μm and about 8 μm) and at least a portion of the long-wavelength infrared (LWIR) 65 range (between about 8 μm and about 15 μm).

Figure 11:
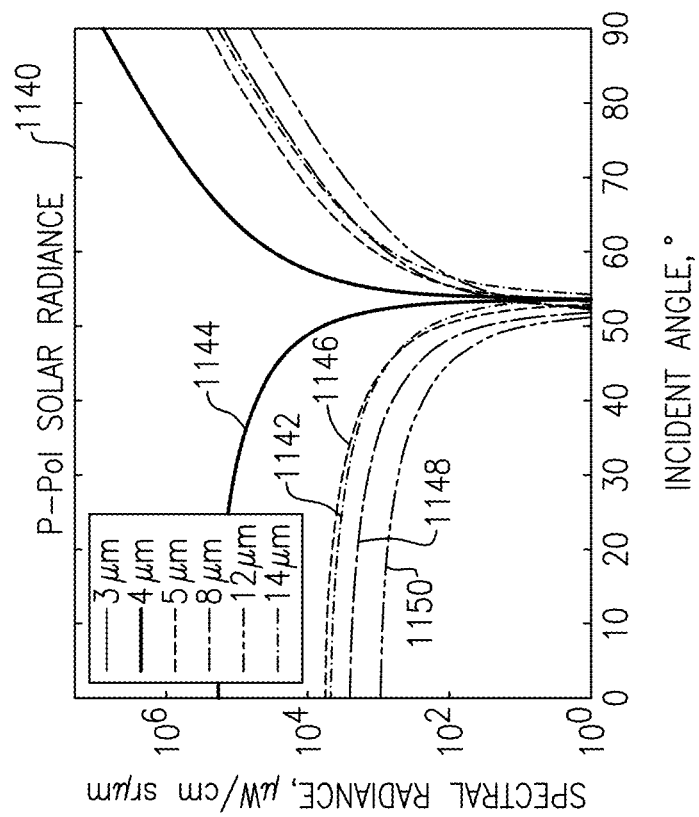
FIG. 11 illustrates several plots of solar radiance performance for different wavelengths in accordance with aspects described herein.
Figure 11:
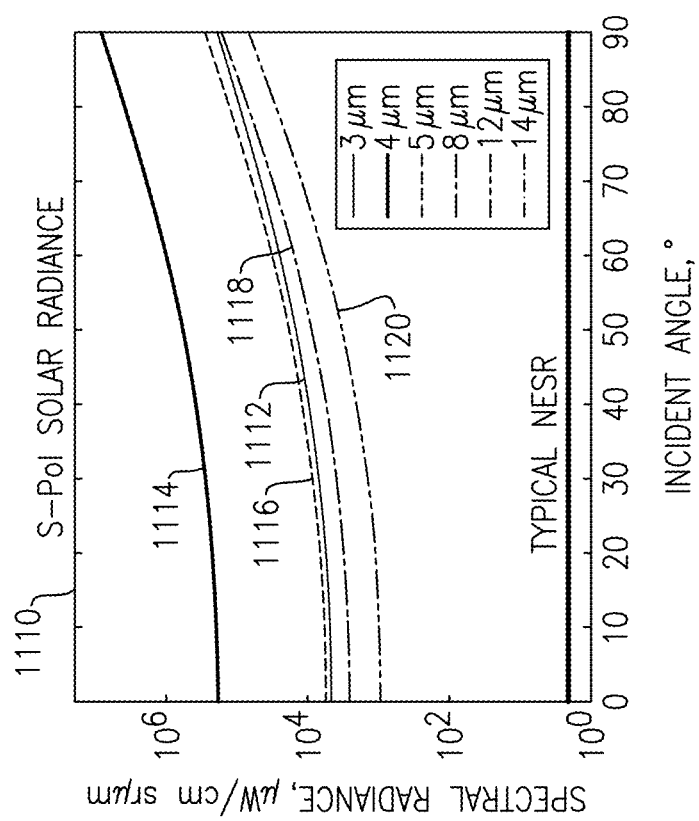

FIG. 11 includes several plots illustrating solar radiance performance for different wavelengths in accordance with aspects described herein. As shown, the first plot 1110 represents solar radiance as a function of incident angle (0 to 90 degrees) for a first polarization (i.e., S-polarization or horizontal polarization) over a wavelength range of 3 μm to 12 μm. In one example, the first plot 1110 includes a first trace 1112 representing a wavelength of 3 μm, a second trace 1114 representing a wavelength of 4 μm, a third trace 1116 representing a wavelength of 5 μm, a fourth trace 1118 representing a wavelength of 8 μm, and a fifth trace 1120 representing a wavelength of 12 μm. Likewise, the second plot 1140 represents solar radiance as a function of incident angle (0 to 90 degrees) for a second polarization (i.e., P-polarization or vertical polarization) over a wavelength range of 3 μm to 12 μm. In one example, the second plot 1140 includes a first trace 1142 representing a wavelength of 3 μm, a second trace 1144 representing a wavelength of 4 μm, a third trace 1146 representing a wavelength of 5 μm, a fourth trace 1148 representing a wavelength of 8 μm, and a fifth trace 1150 representing a wavelength of 12 μm.

In one example, the incident angle in each plot corresponds to the incident angle of light provided from the light source 204 (e.g., the sun) to the body of water 202. Likewise, the magnitude in each plot corresponds to the magnitude of the solar radiance as reflected off the body water 202 and received at the remote sensor system 100. As shown, the magnitude of the reflected spectral radiance may vary over wavelength. For example, the magnitude is greater (brighter) in the mid-wavelength infrared range (i.e., 3 μm to 8 μm) compared to the long-wavelength infrared range (i.e., 8 μm to 15 μm). In some examples, the magnitude variance between wavelengths may contribute to the spectral diversity of the plurality of point reflectors as viewed by the remote sensor system 100, improving the accuracy of the sensor through calibration.

Likewise, the magnitude of the reflected spectral radiance remains substantially stable over the range of incident angles. For example, the typical noise equivalent spectral radiance (NESR) of a hyperspectral imager (HSI) is about 1 μW/cm$^2$sr μm (shown in plot 1110). As shown, the magnitude of the reflected spectral radiance for each wavelength is greater than the typical NESR limit (with exception to ~50-55 degrees for the P-polarization). As such, the remote sensor system 100 can utilize the reflected spectral radiance for calibration purposes over a wide range of incident angles (i.e., times of the day).

Figure 12:
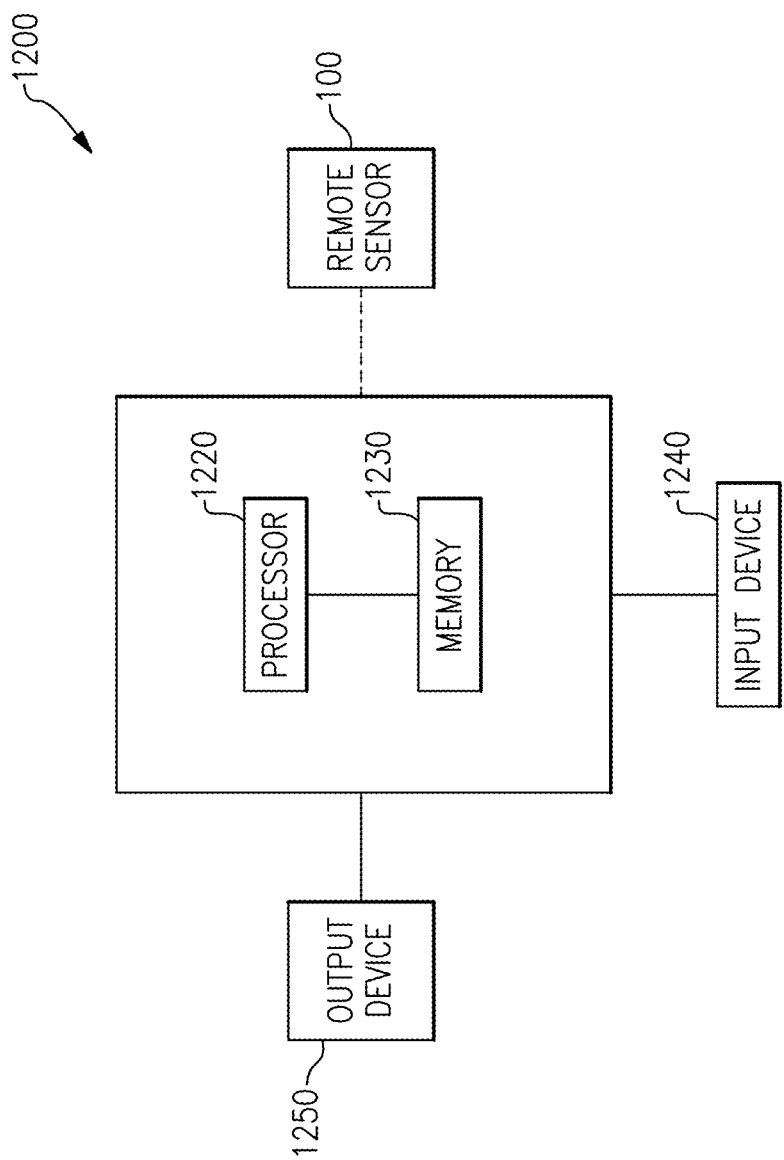
FIG. 12 is a block diagram of a computer system in accordance with aspects described herein.

As described above, the calibration algorithms and models described above may be executed by a processor or controller included in the remote sensor system (e.g., the processor 106). However, in other examples, the calibration algorithms and models may be executed by a different processor, controller, or computer system in communication with the remote sensor system 100. For example, FIG. 12 illustrates a block diagram of a computer system 1200 configured to implement the calibration algorithms, models, or methods in accordance to aspects described herein. As shown in FIG. 12, the computer system 1200 includes a processor (e.g., one or more processors) 1220 and a memory device 1230 in communication with processor 1220. In some examples, the computer system 1200 includes an input device 1240 for inputting data (such as keyboard, a mouse or the like) and an output device 1250 such as a display device for displaying results of the computations/calibrations. In one example, the image data acquired by the remote sensor system 100 is provided to the computer system 1200 (e.g., transmitted to or downloaded by computer system 1200). In some example, the image data can be processed or analyzed by processor 1220 by executing the algorithm described above (i.e., the method 400 of FIG. 4).

In certain examples, the memory device 1230 can be configured to store the image data. The processor 1220, in communication with the memory device 1230, can be configured to: (i) select point reflector images representing subpixel point sources, the selected point reflector images originating from radiation reflected by the body of water 202 and detected by the remote sensor system 100 (block 402); (ii) co-register each of the selected point reflector images using a fitting function (block 404); (iii) determine a figure of merit describing an error of the fitting function for each of the selected point reflector images to obtain a plurality of figures of merit (block 406); (iv) calculate a combined figure of merit from the plurality of figures of merit (block 408); and (v) minimize the combined figure of merit to obtain a point spread function of the remote sensor system 100 (block 410). In some examples, the processor 1220 can be configured to monitor the point spread function of the remote sensor system 100 relative to a normal threshold range and calibrate the remote sensor system 100 based on a spatial characteristic of the remote sensor system 100 in response to the point spread function being outside the normal threshold range.

As described above, systems and methods for vicarious calibration of remote sensors using naturally occurring point sources are provided herein. In at least one embodiment, a remote sensor is configured to detect solar glint from random wave action while over at least one body of water. In some examples, the solar glint is used as point sources to calculate point spread functions for spatial calibration of the remote sensor. In certain examples, corrections can be made based on the calculated point spread functions to remove fine focus or wavefront errors, relieve pre-launch tolerances, and extend the service life of the remote sensor.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method for vicarious spatial characterization of a remote sensor system, comprising:
    detecting, via the remote sensor system, radiation reflected from at least one body of water corresponding to a plurality of point reflector images;
    selecting a set of point reflector images from the plurality of point reflector images, the selected set of point reflector images corresponding to sub-pixel point reflector images;
    analyzing the selected set of point reflector images by executing an algorithm for fitting the point reflector images to obtain a point spread function of the remote sensor system; and
    determining a spatial characteristic of the remote sensor system based on the point spread function.

2. The method of claim 1, further comprising calibrating the remote sensor system based on the spatial characteristic of the remote sensor system.

3. The method of claim 2, wherein calibrating the remote sensor system includes adjusting a focus of the remote sensor system based on the spatial characteristic in response to the point spread function being outside of a threshold range.

4. The method of claim 1, wherein detecting radiation reflected from the at least one body of water includes detecting a specular reflection of solar irradiance provided to the at least one body of water at an incident angle, the specular reflection being provided by at least one of wave facets and wave whitecaps in the at least one body of water.

5. The method of claim 4, wherein detecting the specular reflection of the solar irradiance includes detecting specular reflections of the solar irradiance over a plurality of incident angles.

6. The method of claim 1, wherein the remote sensor system is located on one of a manned or unmanned aircraft, a satellite, or another aerial vehicle, and the method further comprises positioning the remote sensor system such that the at least one body of water is in a field of view of the remote sensor system.

7. The method of claim 1, wherein analyzing the selected set of point reflector images by executing the algorithm for fitting the point reflector images to obtain the point spread function of the remote sensor system includes:
    fitting each of the selected point reflector images using a fitting function;
    determining a figure of merit of the fitting function for each of the selected point reflector images to obtain a plurality of figures of merit;
    calculating a sum of all the figures of merit; and
    minimizing the sum of all the figures of merit to obtain the point spread function of the remote sensor system.

8. The method of claim 7, further comprising fitting each of the selected point reflector images without varying a full width at half maximum parameter of the fitting function and minimizing the sum of all figures of merit.

9. The method of claim 8, further comprising shifting a fitting function of each of the selected point reflector images to superimpose a fitting function corresponding to each selected point reflector image to obtain co-registered fitting functions.

10. The method of claim 8, wherein determining the spatial characteristic comprises determining a spatial resolution of the remote sensor system from the full width at half maximum of the fitting function.

11. A remote sensor system configured to provide imaging for airborne and/or space-based applications, the remote sensor system comprising:
    an electro-optical/infrared (EO/IR) sensor configured to detect radiation reflected from a body of water;
    a receiver configured to receive a plurality of point reflector images corresponding to the radiation detected by the EO/IR sensor; and
    a processor coupled to the receiver and configured to:
        select a set of point reflector images from the plurality of point reflector images, the selected set of point reflector images corresponding to sub-pixel point reflector images;
        analyze the selected set of point reflector images by executing an algorithm for fitting the point reflector images to obtain a point spread function of the remote sensor system; and
        determine a spatial characteristic of the remote sensor system based on the point spread function.

12. The system of claim 11, wherein the processor is further configured to calibrate the remote sensor system based on the spatial characteristic of the remote sensor system.

13. The system of claim 12, wherein calibrating the remote sensor system includes adjusting a focus of the remote sensor system based on the spatial characteristic in response to the point spread function being outside of a threshold range.

14. The system of claim 11, wherein the radiation detected by the EO/IR sensor corresponds to a specular reflection of solar irradiance provided to the at least one body of water at an incident angle, the specular reflection being provided by at least one of wave facets and wave whitecaps in the at least one body of water.

15. The system of claim 14, wherein the EO/IR sensor is configured to detect radiation corresponding to specular reflections of the solar irradiance over a plurality of incident angles.

16. The system of claim 11, wherein the remote sensor system is located on one of a manned or unmanned aircraft, a satellite, or another aerial vehicle that is positioned such that the at least one body of water is within a field of view of the remote sensor system.

17. The system of claim 11, wherein to analyze the selected set of point reflector images by executing the algorithm for fitting the point reflector images to obtain the point spread function of the remote sensor system, the processor is further configured to:

fit each of the selected point reflector images using a fitting function;

determine a figure of merit of the fitting function for each of the selected point reflector images to obtain a plurality of figures of merit;

calculate a sum of all the figures of merit; and minimize the sum of all the figures of merit to obtain the point spread function of the remote sensor system.

18. The system of claim 17, wherein the processor is further configured to execute a first loop to fit each of the selected point reflector images without varying a full width at half maximum parameter of the fitting function and execute a second loop to minimize the sum of all the figures of merit.

19. The system of claim 18, wherein the processor is further configured to shift a fitting function of each of the selected point reflector images to superimpose the fitting function corresponding to each selected point reflector image to obtain co-registered fitting functions.

20. The system of claim 18, wherein the spatial characteristic comprises a spatial resolution of the remote sensor system corresponding to the full width at half maximum of the fitting function.

\* \* \* \* \*